(12) United States Patent
DeSorbo

(10) Patent No.: US 7,736,773 B2
(45) Date of Patent: Jun. 15, 2010

(54) DUAL POWER SUPPLY FOR ELECTRONIC DEVICES

(75) Inventor: Alexander P. DeSorbo, Woodbury, CT (US)

(73) Assignee: Anton/Bauer, Inc., Shelton, CT (US)

( * ) Notice: Subject to any disclaimer, the term of this patent is extended or adjusted under 35 U.S.C. 154(b) by 1393 days.

(21) Appl. No.: 11/106,908

(22) Filed: Apr. 15, 2005

(65) Prior Publication Data

US 2005/0233180 A1 Oct. 20, 2005

Related U.S. Application Data

(60) Provisional application No. 60/563,159, filed on Apr. 16, 2004.

(51) Int. Cl.
*H01M 8/04* (2006.01)
*H01M 8/12* (2006.01)
*H01M 2/00* (2006.01)
*H02J 7/00* (2006.01)

(52) U.S. Cl. .............................. 429/12; 429/22; 429/23; 429/61; 320/101

(58) Field of Classification Search ................. 320/101; 361/601; 429/12, 34, 96, 22, 23, 61
See application file for complete search history.

(56) References Cited

U.S. PATENT DOCUMENTS

| | | | |
|---|---|---|---|
| 4,810,204 A | | 3/1989 | Wilson |
| 5,401,589 A | * | 3/1995 | Palmer et al. ................. 429/13 |
| 6,326,097 B1 | * | 12/2001 | Hockaday .................... 429/34 |
| 2003/0142467 A1 | * | 7/2003 | Hachiya et al. ............. 361/681 |

* cited by examiner

*Primary Examiner*—Patrick Ryan
*Assistant Examiner*—Julian Mercado
(74) *Attorney, Agent, or Firm*—McCormick, Paulding & Huber LLP

(57) ABSTRACT

A dual power supply assembly for providing power to an electrical device includes a fuel cell and a battery in electrical communication with the fuel cell. The fuel cell and the battery act in tandem to supply power to the electrical device. Either the fuel cell of the battery may be removed from the dual power supply assembly without interrupting the continuous operation of the electrical device.

21 Claims, 3 Drawing Sheets

DUAL POWER SUPPLY FOR ELECTRONIC DEVICES

CROSS REFERENCE TO RELATED APPLICATIONS

This application claims the benefit of U.S. Provisional Application Ser. No. 60/563,159, filed on Apr. 16, 2004, and herein incorporated by reference in its entirety.

FIELD OF THE INVENTION

This invention relates in general to a dual power supply for electronic devices, and deals more particularly with a dual power supply for electronic devices that utilizes a rechargeable battery in operative and selective communication with a fuel cell assembly.

BACKGROUND OF THE INVENTION

Power supplies of one sort or another are ubiquitous in our technology-driven world. Perhaps the best known portable power supply are batteries, of which there are many types and kinds. Batteries are very versatile power supplies in that they are typically able to power several times their optimum load for short periods of time. Indeed, the average lifespan of a battery is largely dependent upon the duration of its use, in combination with the size of the load applied thereto.

Rechargeable batteries are also known, and they differ only slightly from conventional non-rechargeable batteries in that they may be periodically re-energized via external sources.

Despite their inherent versatility, batteries (both primary batteries, as well as rechargeable batteries) have a limited lifetime and usefulness, and must be replaced or recharged periodically. Thus, operators of high-load electronic equipment often carry several back-up batteries to address the extended operation of their equipment.

Fuel cells are also known power supplies, and are able to produce electrical power from the interaction of a fuel stream, typically consisting of hydrogen gas or the like, and an oxidant stream that contains oxygen. Other types of fuel cells, utilizing different fuel and oxidant streams, are also known.

Practical applications for fuel cells have largely focused on large-scale uses such as stand-by power systems, and automobiles. This is due to the volumetric inefficiencies of fuel cell power plants, which are typically large in size. Thus, fuel cells are not currently considered as viable power supplies for widescale application for small scale electronic devices and appliances.

Moreover, fuel cells are typically designed within demanding parameters. That is, fuel cells are designed to address specific size, weight and performance criteria. In contrast with batteries, fuel cells are able to provide power only marginally above their nominal level, and then for only short durations. If asked to exceed their nominal power output, fuel cells exhibit the characteristic of constant power supplies in that they will typically reduce their voltage output in accordance with Watt's law, addressing a higher current demand by supplying a corresponding lower voltage until such a time that the voltage is no longer capable of powering the load/electronic device.

For this reason, especially when fuel cells are utilized in automobile applications, batteries are employed as the primary power source for the nominal load and in order to address the transient peak loads that the fuel cell alone would otherwise be unable to handle. Such battery complimented fuel cell systems are often termed 'hybrid' systems.

Other, somewhat smaller, hybrid power systems have been proposed, yet the operation of the batteries in these systems has been limited to merely assisting in the requisite temperature rise necessary to start the chemical reaction within the fuel cell itself. Batteries in hybrid systems have also been employed to provide some capacitance by which to insulate the fuel cell from transient currents, thereby allowing the voltage output from the hybrid system to remain substantially constant.

Still further, the batteries utilized in known hybrid power systems are integral to the fuel cell construction, and have not been designed to handle the nominal load placed on the fuel cell. Thus, known hybrid systems utilize their integral batteries to merely assist the fuel cell, which itself is the main power supply for the electrical device.

Known fuel cell hybrid power systems also suffer from being a 'closed' power system. That is, known hybrid power systems are only designed to address the power demands of a specific type of electric device, and most commonly are designed to address the power demands of a single, individual unit within the specific type of electric device. Thus, known hybrid power systems are not capable of powering even other units within the specific type of electrical device, and are certainly incapable of being mounted to and servicing the power demands of a wide variety of electric devices.

Automotive hybrid power systems are but one example of a closed power system in that they are only designed for a specific type of electric device (an automobile), and are only useable with a single vehicle. The hybrid power system of one vehicle cannot be simply disconnected and mounted to the chassis of another vehicle without extensive labor and expense. Moreover, the hybrid power system of a vehicle certainly cannot be mounted or connected to a different type of an electric host device, such as a video camera or the like.

In spite of the limitations discussed above, there are conceivably a wide range of products that would benefit from the use of fuel cells as a power supply. For example, in those applications where the electrical device is operated for extended periods of time away from a landed AC power source, it is often necessary to carry large amounts, and differing kinds, of batteries and/or associated recharging devices. One benefit of fuel cells, despite their volumetric inefficiency, is that the fuel itself (apart from its converter apparatus) can be carried in relatively smaller and lighter containers versus carrying the equivalent power in batteries.

Batteries, however, remain the power supply of choice in many fields, including, by way of illustration and example, that of professional camera and video operators. In the professional video art, a video camera may be used in different environments, by different operators and for different durations. A selection of battery sizes, chemistries and capabilities will allow the video camera to be used in all of these different situations, wherein the selection of batteries is optimized by the preference of the operator considering the environmental and running time requirements.

As discussed above, the optimization of size, weight and run time is not available to a fuel cell, whose output is largely defined by its size and weight. Moreover, the size and weight of a fuel cell that was designed to handle all operating conditions, would negatively affect the ergonomics of today's camera and video units, which have increasingly become smaller and lighter. Still further, because a fuel cell could be sized to only address a device of certain. characteristics, its flexibility to be used interchangeably in several different devices would be severely limited.

Large scale video operations, such as those employed for news services and the like, could have literally hundreds of cameras. Each camera could range in power requirements from 15-50 watts and have accessories, such as lights, that could add from 25-85 watts per camera. Therefore, the requisite power range in professional video applications such as news gathering (ENG), field productions (EFP), event videography (e.g., weddings) and government or corporate video operations, can range anywhere from 15-150 watts. This 10× power range makes it virtually impossible for a fuel cell of existing technology to universally power this range of device. Moreover, the upper range of the power requirement would necessitate a fuel cell which would be so large and heavy to be ergonomically impractical for the device it would power. Clearly, the application of fuel cells is limited in circumstances where the size and power demands of a wide range of devices, or of a portable device with high current requirements, make the volumetric limitations of fuel cells impractical.

As will be appreciated by a review of the foregoing, neither batteries, nor existing technology fuel cells, can efficiently and fully address the power, space and weight requirements of small-scale electrical appliances and devices on their own. Indeed, even the application of known hybrid designs cannot address these concerns as known hybrid power plant systems approach or exceed the size of small-scale electrical appliances. Moreover, known hybrid systems require the integral coupling between a battery and a fuel cell, thus making replacement of the battery a time consuming and labor intensive act which interrupts the continuous operation of the device. Still further, known fuel cell hybrid power systems are incapable of being selectively applied to a wide variety of electric host devices, instead being limited to use with a very specific type, and most commonly an individual unit, of an electric host device.

With the forgoing problems and concerns in mind, it is the general object of the present invention to provide a dual power supply for portable electronic devices that addresses the shortcomings of both batteries and fuel cells by extending the operating time of the device, while permitting the continuous operation of the device even during times of battery or fuel replacement.

SUMMARY OF THE INVENTION

It is an object of the present invention to provide a dual power supply for electronics.

It is another object of the present invention to provide a dual power supply for electronics that selectively couples rechargeable batteries with fuel cells.

It is another object of the present invention to provide a dual power supply for electronics that selectively couples rechargeable batteries with fuel cells such that one of these two components may be removed and replaced without interrupting the continuous operation of the electrical device.

It is another object of the present invention to provide for interchangeable mountings for both the rechargeable batteries and the fuel cells, such that they may be releasably mounted to one another and the electrical device.

It is another object of the present invention to provide a dual power supply wherein both the rechargeable battery and the fuel cell each share the nominal operating load of the electrical device.

It is another object of the present invention to provide a dual power supply wherein the rechargeable battery and the fuel cell may each selectively share the nominal operating load of the electrical device.

It is another object of the present invention to provide a dual power supply wherein the fuel cell recharges the battery when not operating at its maximum capability.

In accordance, therefore, with one aspect of the present invention, a dual power supply assembly for providing power to an electrical device includes a fuel cell and a battery in electrical communication with the fuel cell. The fuel cell and the battery act in tandem to supply power to the electrical device. Either one or the other of the the fuel cell or the battery may be removed from the dual power supply assembly without interrupting the continuous operation of the electrical device.

In accordance with another aspect of the present invention, a dual power supply assembly for providing current to an electrical device includes a fuel cell; and a battery in electrical communication with the fuel cell. The fuel cell and the battery act in tandem to supply current to the electrical device. Common (i.e., the same or compatible) mounting means are disposed on the battery and the fuel cell, while the electrical device includes matching mounting means that operatively and selectively mate with the common mounting means.

In accordance with still yet another aspect of the present invention, a method of providing current to an electrical device involves providing a first mounting means to the electrical device. A second mounting means is provided to a fuel cell assembly and a battery. The fuel cell assembly and the battery act in tandem to supply the current to the electrical device. The second mounting means are selectively and releasably matable with the first mounting means.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
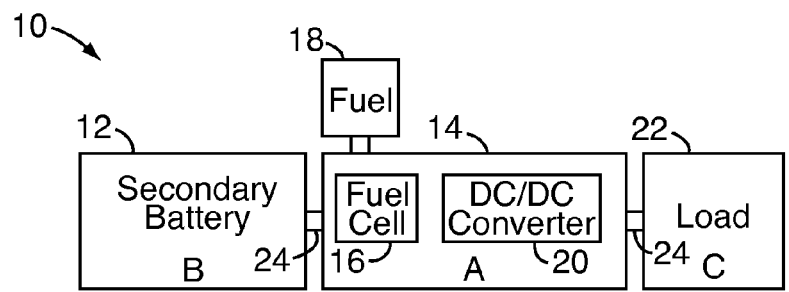
FIG. 1 is a block diagram illustrating the preferred architecture of a dual power supply, in accordance with one embodiment of the present invention.

FIG. 1 illustrates the preferred architecture of a dual power supply assembly 10, in accordance with one embodiment of the present invention. As shown in FIG. 1, the dual power supply assembly 10 includes a rechargeable battery 12 and a fuel cell 14. The fuel cell 14 itself includes a fuel cell assembly 16, a fuel supply 18 and a DC/DC converter 20. A load 22, in the form of an electrical device such as a video camera, is also depicted in FIG. 1.

Although the dual power supply assembly 10 has been described as preferably containing a rechargeable battery 12 to assist in the powering of a video camera, it will be readily appreciated that the present invention is not limited in this regard. Indeed, the present invention equally contemplates the use of non-rechargeable batteries for assistance in powering any type of electronic equipment, such as but not limited to cameras, medical equipment, cell phones, televisions, radios, and other electronic host devices.

Still further, the present invention also contemplates the interchangeable combination of multiple fuel cells for use in powering electronic device, as well as the interchangeable combination of fuel cells and rechargeable batteries.

Returning again to FIG. 1, the preferred embodiment shows how the fuel cell 14 is sandwiched between the load 22 and the rechargeable battery 12. Common and interchangeable mounts 24 are also shown in FIG. 1 and provide the scaffolding by which the rechargeable battery 12 and the fuel cell 14 may be selectively connected to each other, as well as to the load 22. As will be discussed in more detail later, the mounts 24 permit the rearrangement of the rechargeable battery 12 and the fuel cell 14 with respect to the load 22 such that the rechargeable battery 12 may be alternatively sandwiched between the fuel cell 14 and the load 22.

Figure 2A:
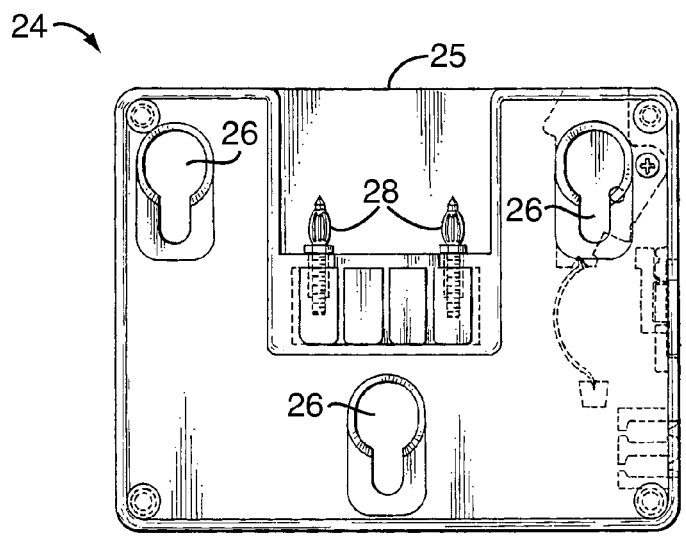
FIG. 2A is a side elevational view of the female plate of a common mounting assembly.
Figure 2B:
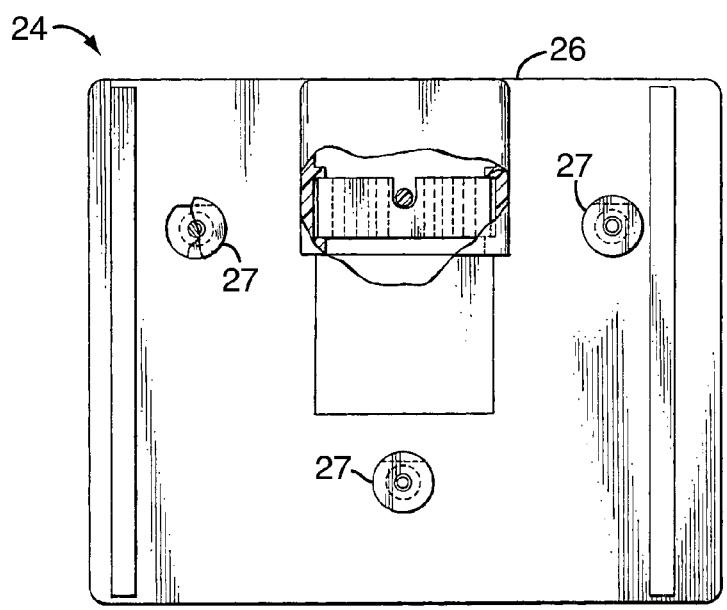
FIG. 2B is a side elevational view of the male plate of a common mounting assembly.

The mounts 24 themselves may have any particular structural configuration, provided that they are capable of mechanically and electrically mating the rechargeable battery 12 and the fuel cell 14 to the load 22. One example of such a common mechanical/electrical mount is shown in FIGS. 2A and 2B, and discussed in detail in common-owned U.S. Pat. No. 4,810,204, herein incorporated by reference in its entirety.

As shown in FIG. 2A, a female plate 25 of the mount 24 may be formed to include a series of retaining apertures 26 to mechanically and releasably fix one component of the dual power assembly 10 to another, via matching contact posts 27 disposed on the male plate 26 (shown in FIG. 2B). Moreover, one or more electrical contacts 28 on the female plate 25 provides an electrical connection, via matching electrical connections 29 on the male plate 26, to the components of the dual power assembly 10. As will be appreciated, all components of the dual power assembly 10 will be formed to be structurally and electrically capable of releasably mating with whatever structure is chosen for the mounts 24.

As shown in FIGS. 2A and 2B, the female and male plates, 25 and 26 respectively, of the common mount 24 may be individually provided to the fuel cell 14, the battery 12 and the electric host device so as to enable the 'stacking' or combined mating of these elements, at the discretion of an operator.

It is therefore an important aspect of the present invention that the fuel cell 14 is not integrally formed, constructed or mated with the rechargeable battery 12. Thus, when it is desired or required to remove one of the components from the dual power assembly 10, the component may be easily detached and removed for repair or replacement. This is in stark contrast with known fuel cell hybrid power systems in which the battery component is integrally mated with the fuel cell assembly, and which may not be separated therefrom without the substantial disassembly of the hybrid system from the device as a whole.

The present invention also differs significantly from known fuel cell hybrid power system in which the interchange of either the fuel cell or the battery has not been contemplated, or indeed as in motor vehicle applications, is of a size and weight and complexity as to be impractical.

It is another important aspect of the present invention that the order in which the components of the dual power assembly 10 are connected may be selectively altered, also in contrast with known hybrid systems. Indeed, as noted previously, the configuration of the dual power assembly 10 shown in FIG. 1 depicts the fuel cell 14 being sandwiched between the load 22 and the rechargeable battery 12. Such a configuration permits the rechargeable battery 12 to be selectively removed from the fuel cell 14 without affecting the supply of power from the fuel cell 14 to the load 22.

Thus, another important aspect of the present invention lies in the ability of the dual power assembly 10 to permit the removal of one of the two power supplying components (either the rechargeable battery 12 or the fuel cell 14) without discontinuing power to the load 22. By enabling the selective decoupling of one of the two power supplying components, while maintaining the continuous power supply to, and operation of, the load 22, the present invention provides an ease of use and an efficiency of operation not heretofore known in any hybrid power system.

Referring again to FIG. 1, the rechargeable battery 12 and the fuel cell 14 are preferably controlled so as to share the nominal operating load of the electrical device to which they are connected. As will be discussed in more detail later, the rechargeable battery 12 may also be employed to absorb and compensate for peak loading of the dual power assembly 10. When not operating to its maximum capability, the fuel cell 14 may supply a charging current to the rechargeable battery 12, while simultaneously supplying the load 22 with its required power.

It is therefore yet another important aspect of the present invention to provide a perpetual power system by which the rechargeable battery 12 is intermittently charged by the fuel cell 14 during the continuous operation of the electrical device (load 22). As will be appreciated, the dual power assembly 10 is therefore able to provide continuous, perpetual power to the load 22 for as long as fuel is provided to the fuel cell 14, irrespective of the charge or even existence of the rechargeable battery 12.

Figure 3:
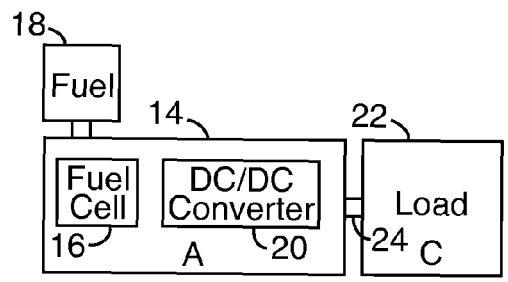
FIG. 3 is a block diagram illustrating the lone attachment of a fuel cell assembly to provide power to an electrical load.
Figure 4:
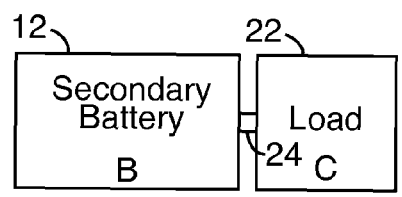
FIG. 4 is a block diagram illustrating the lone attachment of a battery to provide power to an electrical load.

FIGS. 3 and 4 further illustrate the versatility of the dual power assembly 10. As shown in FIG. 3, and as previously discussed, the fuel cell 14 may be directly coupled, by itself, to the load 22, owing to the common nature of mount 24. Similarly, FIG. 4 illustrates the rechargeable battery 12 being directly coupled, by itself, to the load 22, again owing to the common nature of the mount 24.

It will thus be readily appreciate by one of ordinary skill in the art that the present invention differs significantly from known hybrid power systems in that the differing power components (i.e., the rechargeable battery 12 and the fuel cell 14) may be independently and selectively connected to the load 22. As previously noted, known hybrid power systems have power components which are integrally mated to one another, and certainly do not permit the selective removal or application of one of the two components, so as to enable the direct coupling of the other power component to the load 22.

Figure 5:
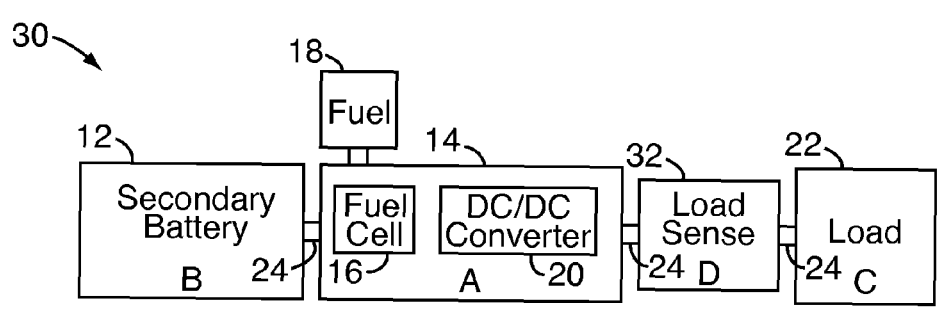
FIG. 5 is a block diagram illustrating the preferred architecture of a dual power supply having a load sensing circuit, in accordance with another embodiment of the present invention.

FIG. 5 illustrates a dual power assembly 30, in accordance with another embodiment of the present invention. As shown in FIG. 5, the dual power assembly 30 includes not only the rechargeable battery 12 and the fuel cell 14, but also a load sensing circuitry 32. The load sensing circuitry 32 is microprocessor/computer controlled and is utilized to determine how much power from the rechargeable battery 12 is required, as well as determining when the charging of the rechargeable battery 12 can take place via the fuel cell 14.

During times when the load 22 is being supplied with power, continuous load sensing is accomplished by the load sensing circuitry 32, via a low resistance sense resistor in series with the output of the power components, 12 and 14. The voltage drop across the resistor is directly proportional to the current demand from the load 22. The resultant voltage signal is then fed into a suitable signal conditioning circuit, such as a precision differential amplifier, where it is filtered to a level that is more useful to the microprocessor. This conditioned voltage signal is then applied to an analog-to-digital converter (ADC) port of the microprocessor, where the ADC signal is continuously monitored, through appropriate software, to determine if the draw from the load 22 exceeds the capabilities of the fuel cell 14.

If the microprocessor determines that assistance from the rechargeable battery 12 is required, e.g., to address peak or transient loads, a field effect transistor (or similar switching device) will be activated to permit current flow from the rechargeable battery 12 to the load 22, in parallel with the power being supplied by the fuel cell 14. At the same time, blocking diodes would be switched in series with the rechargeable battery 12 and the fuel cell 14 to prevent backfeeding.

In addition, the load sensing circuitry 32 also enables the microprocessor to disable any charging of the rechargeable battery 12 that may be ongoing when the load sensing circuitry 32 determines that additional power is required. When the charging is disabled, the microprocessor also stores state-of-charge (SOC) data on the rechargeable battery 12. In this manner, the load sensing circuitry 32 effectively 'remembers' the SOC of the rechargeable battery 12 at the time it is brought on-line to assist in the powering of the load 22.

When the microprocessor determines that assistance from the rechargeable battery 12 is no longer required, charging of the rechargeable battery 12 will then be permitted to resume, and the SOC data would be offset by the amount of current delivered by the rechargeable battery 12 during the time of its assistance in powering the load 22. Appropriate software charge cutoff algorithms would subsequently control the cessation of the charging by the fuel cell 14 in dependence upon the particular chemistry of the rechargeable battery 12 used in the system.

Figure 6:
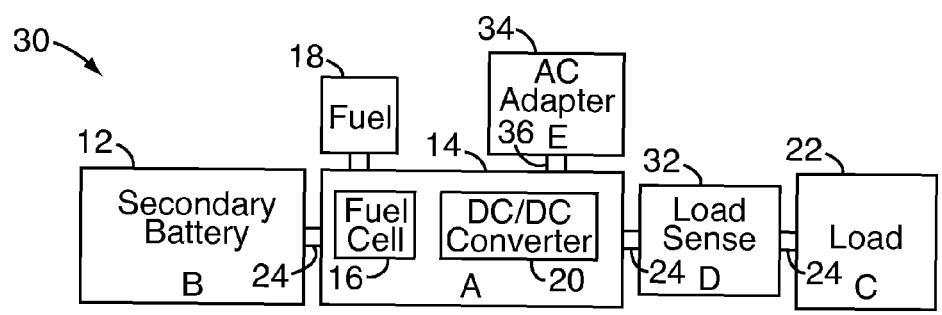
FIG. 6 is a block diagram illustrating the preferred architecture of a dual power supply having a load sensing circuit and an AC adapter (i.e., providing AC to DC conversion capability), in accordance with another embodiment of the present invention.

As shown in FIG. 6, an optional AC adapter 34 can also be employed for charging the rechargeable battery 12, and thus powering the load 22. When so employed, the load sensing circuitry 32 will detect the presence of the AC adapter 34 and disable the ability of the fuel cell 14 to charge the rechargeable battery 14, while enabling the charging activity via the AC adapter 34.

Still further, the load sensing circuitry 32 also includes a voltage comparator in communication with an AC adapter jack 36 of the fuel cell 14. The output from the comparator is then fed into the microprocessor. Thereafter, when the presence of AC power is detected, the load sensing circuitry 32 disconnects the fuel cell 14 from charging the rechargeable battery 12 and connects the rechargeable battery 12 to the AC adapter 34. The AC adapter 34 (through its connection with an outside power source) may be independently capable of handling all of the power requirements of the load 22, allowing the tandem fuel supplies, that is, the rechargeable battery 12 and the fuel cell 14, to be held in reserve until needed.

Figure 7:
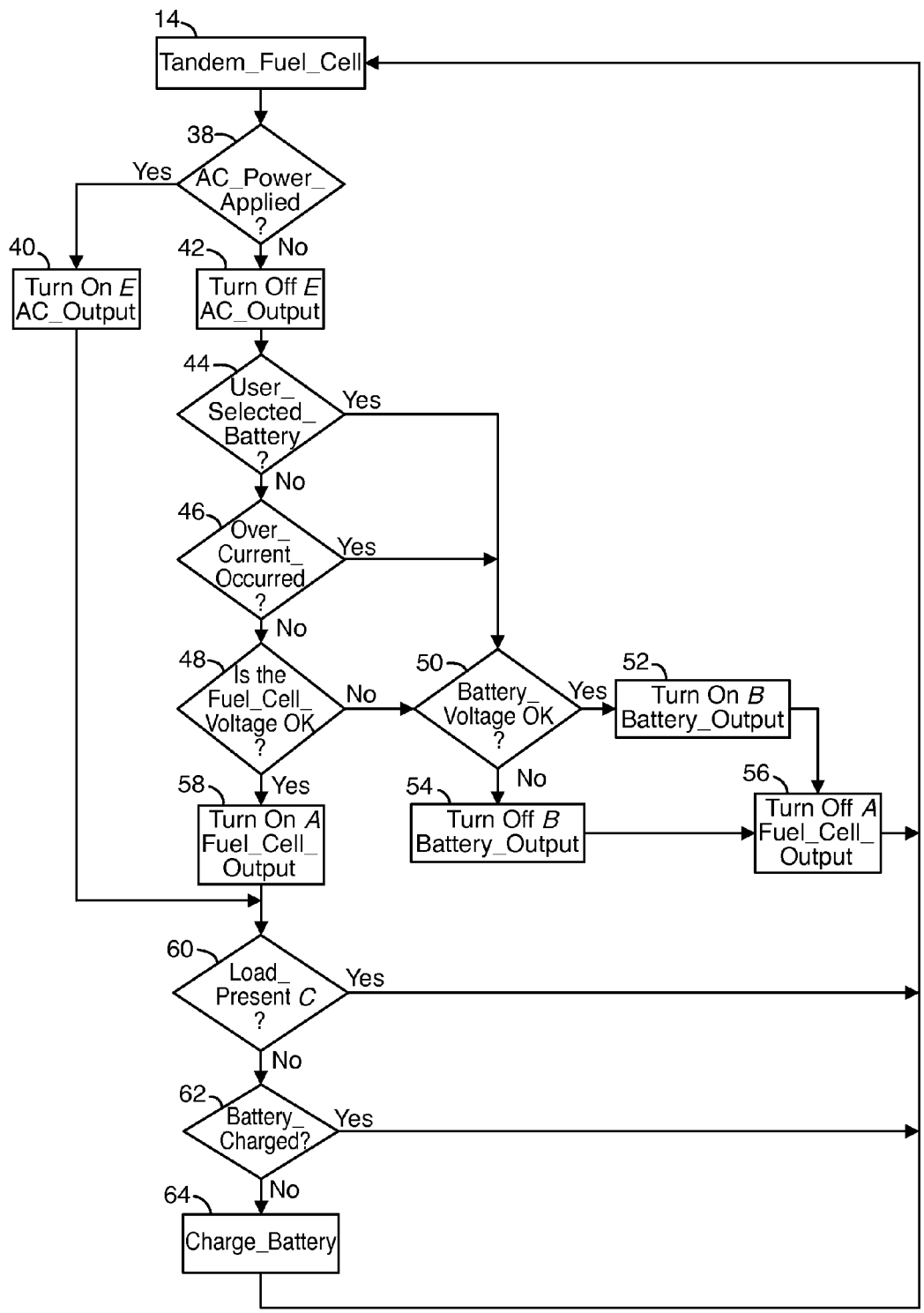
FIG. 7 is a flow chart indicating the general charging operation of the load sensing circuitry shown in FIG. 6.

FIG. 7 illustrates the general charging operation of the load sensing circuitry 32 and integrated microprocessor, as discussed above. The operation of the load sensing circuitry 32 will now be discussed in connection with FIGS. 6 and 7.

As shown in FIG. 7, the load sensing circuitry 32 determines in step 38 whether the AC adapter 34 has been applied to the AC adapter jack 36. If so, the load sensing circuitry 32 permits the flow of power from the AC adapter 34 to the dual power assembly 30, in step 40. If no AC adapter 34 is detected, the load sensing circuitry 32 then bars the flow of power from the AC adapter 34 to the dual power assembly 30, in step 42.

Subsequently, the load sensing circuitry 32 determines if any one of three conditions exist: 1) whether a battery 12 has been selected and mounted to the dual power assembly 30, in step 44; 2) whether the load 22 is demanding peak or excessive current, in step 46; and 3) whether the voltage of the fuel cell 14 is within operating parameters, in step 48.

If the load sensing circuitry 32 determines that a battery has been selected and mounted, or that the load is demanding a peak current, or that the voltage of the fuel cell 14 is not within operating parameters, the load sensing circuitry 32 then checks the voltage of the battery 12, in step 50. If the battery voltage is determined to be within operating parameters, then the load sensing circuitry 32 permits the flow of power from the battery 12 to the load 22, in step 52. If the battery voltage is determined to not be within operating parameters, then the load sensing circuitry 32 bars the flow of power from the battery 12 to the load 22, in step 54.

In those cases where the fuel cell 14 is determined to not have sufficient power, in step 48, the output from the fuel cell 14 is barred in step 56. In all cases, however, when both the battery 12 and the fuel cell 14 are determined to have inadequate power, in steps 48 and 50, then the output from both of the battery 12 and the fuel cell 14 are likewise barred.

It should be noted that the specific circuit configuration of the load sensing circuitry 32, as discussed above, is by way of example only, as other alternative circuit arrangements and components may be utilized without departing from the broader aspects of the present invention.

When the voltage of the fuel cell 14 is determined to be within operating parameters, in step 48, the load sensing circuitry 32 permits the flow of power from the fuel cell 14 to the load 22, in step 58. Next, the load sensing circuitry 32 verifies if the load 22 is present, in step 60, while also determining if the battery 12 is fully charged, in step 62. If the load sensing circuitry 32 determines that the battery 12 requires charging, a charging operation is instigated in step 64.

The present invention also encompasses bidirectional communications between the rechargeable battery 12 and the fuel cell 14, so as to provide fuel gauging and battery cutoff algorithms. A load sensing circuit for monitoring the load on the battery and fuel cell individually would be identical to the load sensing circuitry 32, as previously discussed. The microprocessor would then be supplied with load and capacity data from both the rechargeable battery 12 and the fuel cell 14, thus permitting accurate fueling and charging.

As described above, the load sensing circuitry 32 may be formed integrally with either the fuel cell assembly 14, or the battery 12, or the electrical host device (load) 22. In a preferred embodiment of the present invention, the load sensing circuitry 32 is integrally formed with the electric host device 22 so as to enable continuous monitoring and control over the fuel cell 14 and/or the battery 12 attached thereto.

In another embodiment of the present invention, the load sensing circuitry 32 may instead be housed within a separate control module which is itself capable of mating with the common mount 24, as well as to the electric host device (load) 22. In this manner, the fuel cell 14, the battery 12 and the control module may be selectively and releasably mounted to the electric host device 22, in their desired order, for the purposes of managing, monitoring and directing the operation of each component of the dual power supply, separately and in combination with each other.

As will be appreciated by consideration of the embodiments illustrated in FIGS. 1-7, a dual power assembly of the present invention provides for the tandem use of batteries and fuel cells to power even small electronic appliances and devices. In particular, and in contrast to known hybrid power systems, the dual power assembly of the present invention provides common mounts 24 to the battery 12 and the fuel cell 14, so as to enable the selective application of one, or both, power supplies in order to address the load 22. The load 22 of course exhibits a matching mounting structure that is capable of selectively and releasably mating with the mounts 24 found on the battery 12 and on the fuel cell 14.

Indeed, the ability to interchangeably power the load 22 with the battery 12 alone, or the fuel cell 14 alone, or the battery 12 in combination with the fuel cell 14 together (in whatever order), results in a level of versatility and efficiency that is not possible with known hybrid power systems. Moreover, the common mounts 24 enable a plurality of differently sized batteries 12 to be utilized with the same fuel cell 14 and load 22, an advantageous capability also not shown by known hybrid power systems.

Not only can the order in which the power components are connected to the load 22 be changed, in dependence upon a particular application and/or desire, but one of the two power components may be removed from the load 22, while the other power component remains in communication with, and feeding power to, the load 22. Thus, the dual power assembly of the present invention provides for uninterrupted, continuous power to be delivered to the load 22 even when one of the two power components are being removed or replaced. Such a versatility is not shown in known hybrid power systems.

The present invention also diverges from the known hybrid power systems in that, at any given time, both the battery 12 and the fuel cell 14 will be employed to address the nominal demands of the load 22. Also, the load sensing circuitry 32 effectively manages the control over the battery 12, the fuel cell 14 and the load 22 such that an optimal performance is achieved, all while the battery 12 is recharged for perpetual use, when possible and appropriate.

As will also be appreciated, the dual power supply of the present invention is capable of mating with, and therefore powering, any conceivable electric host device which is itself capable of mating with the common mating means of the present invention. Thus, the dual power supply of the present invention could first provide power to, e.g., a video camera, and then be disconnected from the video camera, only to be mounted to another (i.e., any other) type of electric host device, e.g., a laptop computer.

Thus, the capabilities of the present invention differ significantly from known fuel cell hybrid power systems, in that known fuel cell hybrid power systems are designed to be utilized only with a specific type of host device (e.g., automobiles), and then for only a specific model of automobile. Indeed, with particular respect to automotive hybrid power systems, it is not only that known automotive hybrid power systems are designed for use only with a specific model of a specific type of electric host device, but also that they are specifically tailored to an individual unit of a specific model of a specific type of electric host device. Thus, it is not possible with known fuel cell hybrid power systems to endow them with the ability to mate with other types, models or individual units of a specific electric host device, nor do known fuel cell hybrid power systems have the capability to mate with, and provide power to, a wide variety of differing electric host devices.

The present invention therefore permits a fuel cell to be chosen that exhibits the appropriate size, weight and capability for extending the runtime of a host electric device at nominal operating loads. In doing so, the present invention permits the selection of a wide variety of differently-sized batteries which are smaller and lighter, yet capable of both nominal and peak operation of the electric host device. Thus, the combination of the present invention serves to dramatically extend runtime, primarily via the application of the fuel cell, handle a variety of loads and/or duration requirements, primarily via the application of the battery, all while optimizing the size, weight and number of power sources required in a variety of operational conditions for a variety of electric host devices, and within a common interchangeable system.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments.

What is claimed is:

1. A dual power supply assembly for providing power to an electrical device, said dual power supply comprising:
    a fuel cell;
    a battery in electrical communication with said fuel cell, said fuel cell and said battery acting in tandem to supply said power to said electrical device;
    wherein one of said fuel cell and said battery may be removed from said dual power supply assembly without interrupting a continuous operation of said electrical device and wherein both said battery and said fuel cell each share a nominal operating load of said electrical device; and
    circuit means for controlling a transmission of said power from said fuel cell and said battery to said electrical device.

2. The dual power supply assembly according to claim 1, further comprising:
    common mounting means disposed on said battery and said fuel cell for removably mounting one of said fuel cell and said battery to said electrical device.

3. The dual power supply assembly according to claim 1, wherein:
    said battery is a rechargeable battery; and
    said circuit means selectively permits the charging of said rechargeable battery via said fuel cell.

4. The dual power supply assembly according to claim 1, wherein:
    said circuit means controls a transmission of said power from said battery and said fuel cell to said electrical device, in dependence upon a detected load of said electrical device and a detected condition of said battery and said fuel cell.

5. The dual power supply assembly according to claim 1, wherein:
    said battery and said fuel cell each transmit said power to said electrical device concurrently with one another.

6. A dual power supply assembly for providing current to an electrical device, said dual power supply comprising:
    a fuel cell;
    a battery in electrical communication with said fuel cell, said fuel cell and said battery acting in tandem to supply said current to said electrical device;
    common mounting means disposed on said battery and said fuel cell; and wherein said electrical device includes matching mounting means that operatively and selectively mates with said common mounting means and wherein both said battery and said fuel cell each share a nominal operating load of said electrical device.

7. The dual power supply assembly according to claim 6, wherein:
said mating of said matching mounting means and said common mounting means enables mechanical and electrical communication between said electrical load, and one of said battery and said fuel cell.

8. The dual power supply assembly according to claim 6, wherein:
one of said fuel cell and said battery may be removed from electrical communication with said dual power supply assembly without interrupting a continuous operation of said electrical device.

9. The dual power supply assembly according to claim 7, wherein:
one of said fuel cell and said battery may be removed from mechanical communication with said dual power supply assembly without interrupting a continuous operation of said electrical device.

10. The dual power supply assembly according to claim 6, further comprising:
circuit means for controlling a flow of said current from said fuel cell and said battery to said electrical device.

11. The dual power supply assembly according to claim 10, wherein:
said battery is a rechargeable battery; and
said circuit means selectively permits the charging of said rechargeable battery via said fuel cell.

12. The dual power supply assembly according to claim 10, wherein:
said circuit means controls a flow of said current from said battery and said fuel cell to said electrical device, in dependence upon a detected load of said electrical device and a detected condition of said battery and said fuel cell.

13. The dual power supply assembly according to claim 6, wherein:
said battery and said fuel cell each transmit said current to said electrical device concurrently with one another.

14. A method of providing power to an electrical device, said method comprising the steps of:
providing a common mounting means to said electrical device, a fuel cell assembly and a battery, wherein said common mounting means enables the direct coupling between any one of said electrical device, said fuel cell and said battery, with any other of said electrical device, said fuel cell and said battery;
selectively causing said fuel cell assembly and said battery to act in tandem to supply said power to said electrical device and wherein both said battery and said fuel cell selectively share a nominal operating load of said electrical device.

15. The method of providing current to an electrical device according to claim 14, further comprising the steps of:
forming said battery to be a rechargeable battery;
sensing a state of charge of said rechargeable battery;
comparing said state of charge of said rechargeable battery before and after said rechargeable battery is selected to provide said electrical device with said power; and
charging said rechargeable battery in dependence upon said comparison of said state of charge of said rechargeable battery.

16. The method of providing current to an electrical device according to claim 14, further comprising the steps of:
enabling a removal of one of said fuel cell assembly and said battery from electrical communication with said electrical device without interrupting a continuous operation of said electrical device.

17. The method of providing current to an electrical device according to claim 14, further comprising the steps of:
removing one of said fuel cell assembly and said battery from said dual power supply assembly without interrupting a continuous operation of said electrical device.

18. The method of providing current to an electrical device according to claim 14, further comprising the steps of:
providing a circuit means for controlling a transmission of said current from said fuel cell assembly and said battery to said electrical device; and
controlling said circuit means in dependence upon a detected load of said electrical device and a detected condition of said battery and said fuel cell assembly.

19. The method of providing current to an electrical device according to claim 14, further comprising the steps of:
transmitting said current from said battery and said fuel cell assembly to said electrical device concurrently with one another.

20. A dual power supply assembly for providing power to an electric host device, comprising:
a fuel cell;
a battery, said fuel cell and said battery acting in tandem to supply said power to said electric host device;
a mounting module in electrical communication with said fuel cell and said battery and said electric host device, said mounting module providing mechanical as well as electrical communication between said fuel cell and said battery and said electric host device; and
wherein said mounting module monitors and controls operation of said fuel cell and said battery and wherein both said battery and said fuel cell each selectively share a nominal operating load of said electric host device.

21. The dual power supply assembly for providing power to an electric host device according to claim 20, wherein:
one of said fuel cell and said battery may be removed from said dual power supply assembly without interrupting a continuous operation of said electric host device.

* * * * *